United States Patent
Sugimoto (10) Patent No.: US 11,474,086 B2
(45) Date of Patent: Oct. 18, 2022

(54) MEASUREMENT DATA PROCESSING METHOD, MEASUREMENT DATA PROCESSING DEVICE, AND PROGRAM FOR PROCESSING MEASUREMENT DATA

(71) Applicant: SHIMADZU CORPORATION, Kyoto (JP)

(72) Inventor: Yurina Sugimoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 910 days.

(21) Appl. No.: 16/283,201

(22) Filed: Feb. 22, 2019

(65) Prior Publication Data

US 2019/0265213 A1 Aug. 29, 2019

(30) Foreign Application Priority Data

Feb. 26, 2018 (JP) .............................. JP2018-032085

(51) Int. Cl.
*G01N 30/86* (2006.01)
*G01N 30/72* (2006.01)
*G01N 30/02* (2006.01)

(52) U.S. Cl.
CPC ..... *G01N 30/8655* (2013.01); *G01N 30/7233* (2013.01); *G01N 2030/027* (2013.01)

(58) Field of Classification Search
CPC ........... G01N 30/8655; G01N 30/7233; G01N 2030/027; G01N 30/8679
See application file for complete search history.

(56) References Cited

U.S. PATENT DOCUMENTS 5,644,503 A * 7/1997 Ito ...................... G01N 30/8624
  702/22
2009/0175766 A1* 7/2009 deCorral ............... G06T 11/206
  345/428

(Continued)

FOREIGN PATENT DOCUMENTS

| JP | 2017-020877 A | 1/2017 |
| WO | 2017002156 A1 | 1/2017 |
| WO | 2017037829 A1 | 3/2017 |

OTHER PUBLICATIONS

Communication dated Apr. 6, 2021, from the Japanese Patent Office in Application No. 2018-032085.

*Primary Examiner* — David J Bolduc
(74) *Attorney, Agent, or Firm* — Sughrue Mion, PLLC (57) ABSTRACT

A measurement data processing device for graphically displaying measurement data for a plurality of target compounds and for performing quantitative determination for the target compounds is provided. The device includes a display section 7, a measurement data input receiver 43 for receiving an input of measurement data, a screen-display numerical data creator 44 for performing a previously determined process on the measurement data to calculate a quantitative value and create numerical data for screen display, a screen-display graphical data creator 46 for performing a previously determined process on the measurement data for the target compounds to create graphical data for screen display after the numerical data for screen display have been created for all target compounds, and a display processor 48 for displaying, in the display section, the numerical data for screen display and the graphical data for screen display in a form that depends on a user operation.

5 Claims, 7 Drawing Sheets

(56) References Cited

U.S. PATENT DOCUMENTS

| | | | |
|---|---|---|---|
| 2011/0101215 A1* | 5/2011 | Hirabayashi | G01N 30/8675 |
| | | | 250/281 |
| 2013/0297230 A1* | 11/2013 | Kawase | G16C 20/20 |
| | | | 702/32 |
| 2017/0067864 A1* | 3/2017 | Kudo | G01N 30/7266 |
| 2018/0337028 A1 | 11/2018 | Nakaya et al. | |
| 2019/0145943 A1* | 5/2019 | Ito | G01N 30/8651 |
| | | | 703/9 |

* cited by examiner

| Compound No. | Compound Name | Retention Time | Target MRM | Qualifier MRM |
|---|---|---|---|---|
| 1 | Compound A | 0.50-5.00 | 163.10>130.00 | 163.10>117.00 |
| 2 | Compound B | 0.50-5.00 | 167.20>68.00 | 167.20>110.00 |
| 3 | Compound C | 3.00-7.00 | 323.00>128.00 | 263.10>211.00 |
| 4 | Compound D | 4.00-7.00 | 217.20>150.00 | 155.20>90.00 |
| 5 | Compound E | 4.00-7.50 | 355.50>194.00 | 287.10>145.00 |
| ... | ... | ... | ... | ... |
| 300 | Compound X | 25.00-30.00 | 261.00>161.00 | 167.20>151.00 |

MEASUREMENT DATA PROCESSING METHOD, MEASUREMENT DATA PROCESSING DEVICE, AND PROGRAM FOR PROCESSING MEASUREMENT DATA

TECHNICAL FIELD

The present invention relates to a measurement data-processing technique for graphically displaying measurement data obtained for each of a plurality of target compounds and for quantitatively determining each target compound.

BACKGROUND ART

For example, liquid chromatograph mass spectrometers, which are a type of device in which a liquid chromatograph is combined with a mass analyzer, have been used for the quantitative determination of target compounds contained in a sample, such as agricultural chemicals contained in a food product. In a liquid chromatograph mass spectrometer, a multiple reaction monitoring (MRM) measurement is performed to determine the quantities of target compounds contained in a sample (for example, see Patent Literature 1).

For the MRM measurement, MRM measurement conditions should be set for each target compound, including an MRM transition, i.e. the combination of a characteristic precursor ion to be generated from the target compound and a characteristic product ion to be produced through the fragmentation of the precursor ion. In the MRM measurement, target compounds are individually eluted from the column in the liquid chromatograph. During each specific period of time (retention time) within which one of the compounds exits the column, the mass analyzer is controlled to select the precursor ion and the product ion, using the MRM transition specified for the target compound concerned, and measure the intensity of the product ion. The sets of mass chromatogram data respectively obtained for the target compounds are compiled into one measurement data file for each sample and saved.

Dedicated analysis software products have conventionally been used for analyzing mass chromatogram data obtained through an MRM measurement. A user executes a piece of analysis software and opens a measurement data file. The analysis software reads mass chromatogram data for each target compound, creates a mass chromatogram from the mass chromatogram data, and creates an image of the mass chromatogram (e.g. image data is created by determining the colors to be allocated to the two-dimensionally arrayed pixels which constitute a display area). The software also performs a predetermined process on the mass chromatogram data to calculate a quantitative value for each target compound. An example of the "predetermined process" is a process in which the software analyzes the mass chromatogram data of the target compound concerned to extract a peak portion, calculates an area value of the peak portion, and compares the area value with calibration-curve information previously stored in a memory of a computer, where the peak portion is defined as a section of the mass chromatogram which begins at a point where the amount of change in the measurement value reaches or exceeds a predetermined threshold and ends at a point where the amount of change in the measurement value falls below another threshold. After the creation of mass chromatograms, creation of their images, and calculation of the quantitative values have been completed for all target compounds, the analysis software collectively displays those images and values on the screen. The user performs analytical work using the displayed information, such as the checking of the shape of each mass chromatogram displayed on the screen to confirm that no foreign substance is contained, or the checking of the quantitative values for an outlier.

CITATION LIST

Patent Literature

Patent Literature 1: JP 2017-020877 A

SUMMARY OF INVENTION

Technical Problem

In an analysis of target compounds in a sample, such as agricultural chemicals contained in a food product, one sample may have hundreds of target compounds to be tested in the MRM measurement. A measurement data file which holds the result of such a measurement contains mass chromatogram data for hundreds of target compounds. Reading such a file into analysis software requires a considerable amount of time until the process of creating mass chromatograms, creating their images, and calculating quantitative values is completed for all target compounds. Some analysis software products have the function of allowing users to select one or more target compounds so that only the mass chromatograms for the selected target compounds will be displayed on the screen (i.e. the function of narrowing down the mass chromatograms to be displayed). Those analysis software products also require a considerable amount of time for the process of creating mass chromatograms, creating their images and calculating quantitative values for all target compounds, since the process is performed before the selection of the target compounds by users. Thus, those conventional techniques do not allow users to begin the analytical work until the process of creating mass chromatograms, creating their images and calculating the quantitative values is completed for target compounds, and the calculated results become ready for display. Such a working process is inefficient.

The previously described example is concerned with the case of processing mass chromatogram data obtained for each target compound by an MRM measurement performed for a plurality of target compounds contained in one sample. A similar problem can also occur in the case of creating graphs from measurement data obtained through other types of measurements for a plurality of target compounds, creating images for those graphs, and performing a quantitative analysis for each target compound. Furthermore, such problems are not limited to the measurement data obtained by a measurement for a plurality of target compounds contained in one sample; a similar problem can also occur in the case of analyzing measurement data obtained for a plurality of samples.

The problem to be solved by the present invention is to provide a measurement data-processing technique which helps users more efficiently perform analytical work using graphs and quantitative values obtained from measurement data obtained for each of a plurality of target compounds.

Solution to Problem

One aspect of the present invention developed for solving the previously described problem is a measurement data processing method to be used for graphically displaying measurement data for each of a plurality of target compounds and for performing quantitative determination for each of the plurality of target compounds, the measurement data processing method including the steps of:

performing a previously determined process on measurement data for each of the plurality of target compounds, to calculate a quantitative value and create numerical data for screen display; and performing a previously determined process on measurement data for each of the plurality of target compounds to create graphical data for screen display after the numerical data for screen display are created for the plurality of target compounds.

As regards the "previously determined process" for the creation of numerical data for screen display, for example, if the measurement data is mass chromatogram data or spectrum data, the "previously determined process" is a process including the steps of extracting a peak portion from the data, calculating an area value or height of the peak portion, and comparing the calculated value with prepared calibration-curve information, as well as a process of creating numerical data for screen display from a quantitative value obtained through the previous process. As another example, if the measurement data is mass spectrum data, the "previously determined process" is a process including the steps of calculating the intensity (height) of a mass peak at a previously specified mass-to-charge ratio included in the data concerned and comparing the calculated value with prepared calibration-curve information, as well as a process of creating numerical data for screen display from a quantitative value obtained through the previous process.

As regards the "previously determined process" for the creation of graphical data for screen display, for example, if the measurement data is mass chromatogram data, the "previously determined process" is a process including the steps of creating a graph by allocating the measurement values forming the measurement data to the corresponding points on a two-dimensional coordinate system with the two axes indicating time and intensity, and creating an image of the graph.

The creation of the numerical data for screen display, or creation of the graphical data for screen display, means the creation of data that can be instantaneously displayed on a screen in response to a specific user operation on the screen. If the number of target compounds is small, all pieces of information related to those target compounds can be simultaneously displayed within a display area specified by the user (which may be a default area specified by the analysis software). By comparison, if there are hundreds of target compounds, an attempt to simultaneously display numerical data and graphical images showing the quantitative values for all compounds within the display area will result in the individual images being extremely small. A common method for avoiding such a situation is to sequentially display those data according to a screen-scrolling operation by the user. Thus, whether or not the numerical data for screen display and the graphical data for screen display for all target compounds can be displayed on the display area depends on the setting of the screen display by the user as well as the user operation.

In the measurement data processing method according to the present invention, initially, a quantitative value is calculated for each target compound from measurement data of a plurality of target compounds, and numerical data for screen display are created. As explained earlier, the created numerical data for screen display are displayed on the screen in a form that depends on a user operation. Subsequently, a previously determined process is performed on the measurement data for each of the target compounds to create graphical data for screen display. Similar to the numerical data for screen display, the created graphical data for screen display are displayed on the screen in a form that depends on a user operation, as explained earlier.

The process for creating numerical data for screen display is mainly performed by numerical calculations and can be completed within a shorter period of time than the process for creating graphical data for screen display. Therefore, the user can quickly begin the analytical work, such as the checking of the quantitative value of each target compound to determine whether or not an outlier is included in the quantitative values. While the user is performing the analytical work, the graphical data for screen display created from the measurement data are progressively displayed in an appropriate form within the display area. Accordingly, the user can perform the analytical work more efficiently than ever before.

Some analysis software products allow users to perform certain operations on a displayed graph, such as the translation, rotation or scaling of the graph. Creation of the graphical data for screen display which additionally enables such a functionality requires an even longer period of time. Even in such a case, the measurement data processing method according to the present invention allows the user to efficiently perform the analytical work.

Another aspect of the present invention developed for solving the previously described problem is a measurement data processing device to be used for graphically displaying measurement data for each of a plurality of target compounds and for performing quantitative determination for each of the plurality of target compounds, the measurement data processing device including:

a display section;

a measurement data input receiver for receiving an input of measurement data of the plurality of target compounds;

a screen-display numerical data creator for performing a previously determined process on measurement data for each of the plurality of target compounds, to calculate a quantitative value and create numerical data for screen display;

a screen-display graphical data creator for performing a previously determined process on measurement data for each of the plurality of target compounds to create graphical data for screen display after the numerical data for screen display are created for the plurality of target compounds; and a display processor for displaying, in the display section, a portion or the entirety of the numerical data for screen display and the graphical data for screen display in a form that depends on a user operation.

Still another aspect of the present invention developed for solving the previously described problem is a program for processing measurement data to be used for graphically displaying measurement data for each of a plurality of target compounds and for performing quantitative determination for each of the plurality of target compounds, wherein:

the program for processing measurement data is configured to make a computer having a display section function as:

a measurement data input receiver for receiving an input of measurement data of the plurality of target compounds;

a screen-display numerical data creator for performing a previously determined process on measurement data for each of the plurality of target compounds, to calculate a quantitative value and create numerical data for screen display;

a screen-display graphical data creator for performing a previously determined process on measurement data for each of the plurality of target compounds to create graphical data for screen display after the numerical data for screen display are created for the plurality of target compounds; and a display processor for displaying, in the display section, a portion or the entirety of the numerical data for screen display and the graphical data for screen display in a form that depends on a user operation.

Advantageous Effects of Invention

By using a measurement data-processing technique according to the present invention, users can efficiently perform analytical work using graphs and quantitative values obtained from measurement data of a plurality of target compounds.

DESCRIPTION OF EMBODIMENTS

One embodiment of the measurement data processing method and device as well as the program for processing measurement data is hereinafter described with reference to the drawings. The measurement data processing method and device as well as the program for processing measurement data according to the present embodiment are configured to process data obtained through a measurement using a liquid chromatograph mass spectrometer.

Figure 1:
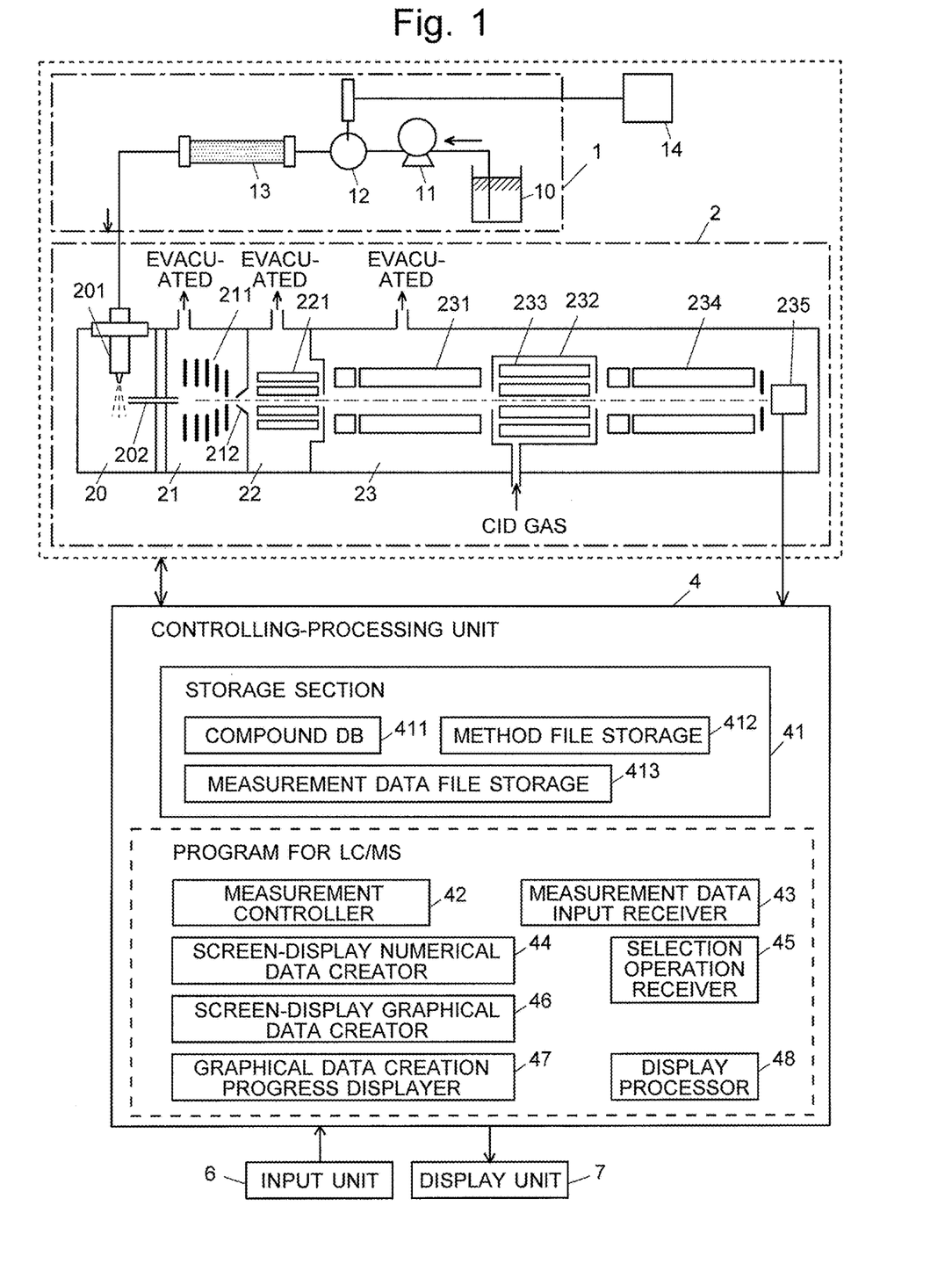
FIG. 1 is a schematic configuration diagram of a liquid chromatograph mass spectrometer system in which one embodiment of the measurement data processing device according to the present invention is combined with a liquid chromatograph mass spectrometer.

FIG. 1 shows a schematic configuration of a liquid chromatograph mass spectrometer system in which the measurement data processing device according to the present embodiment is combined with a liquid chromatograph mass spectrometer. The liquid chromatograph mass spectrometer system in the present embodiment is roughly divided into a liquid chromatograph unit 1, mass spectrometer unit 2 and controlling-processing unit 4 which controls the operations of the previously mentioned units. The controlling-processing unit 4 corresponds to the measurement data processing device according to the present embodiment. In the present embodiment, the controlling-processing unit 4 is configured to have the additional function of controlling a measurement of a sample and other operations using the liquid chromatograph mass spectrometer. However, this function is not essential for the present invention, and the measurement data processing device may be configured as a device separated from a liquid chromatograph mass spectrometer.

The liquid chromatograph unit 1 includes: a mobile phase container 10 in which a mobile phase is stored; a pump 11 for drawing the mobile phase and supplying it at a constant flow rate; an injector 12 for injecting a predetermined amount of sample liquid into the mobile phase; and a column 13 for temporally separating various compounds contained in the sample liquid. An autosampler 14 for individually introducing a plurality of liquid samples into the injector 12 in a predetermined order and at a predetermined timing is connected to the chromatograph unit 1.

The mass spectrometer unit 2 has the configuration of a multi-stage differential pumping system including an ionization chamber 20 maintained at substantially atmospheric pressure and a high-vacuum analysis chamber 23 evacuated with a vacuum pump (not shown), between which a first intermediate vacuum chamber 21 and a second intermediate vacuum chamber 22 are located with their degrees of vacuum increased in a stepwise manner. The ionization chamber 20 has an electrospray ionization (ESI) probe 201 for spraying a sample solution while electrically charging its droplets. The ionization chamber 20 communicates with the first intermediate vacuum chamber 21 through a thin heated capillary 202. The first intermediate vacuum chamber 21 is separated from the second intermediate vacuum chamber 22 by a skimmer 212 having a small hole at its apex. A first ion guide 211 and a second ion guide 221, each of which is used for transporting ions to the subsequent stage while converging the ions, are contained in the first intermediate vacuum chamber 21 and the second intermediate vacuum chamber 22, respectively. The analysis chamber 23 contains a collision cell 232 which has a multipole ion guide (q2) 233 inside. A front quadrupole mass filter (Q1) 231, which separates ions from each other according to their mass-to-charge ratios, is located at the front end of the collision cell 232. A rear quadrupole mass filter (Q3) 234, which also separates ions from each other according to their mass-to-charge ratios, and an ion detector 235 are located at the rear end of the collision cell 232. Collision-induced dissociation (CID) gas, such as argon gas or nitrogen gas, is appropriately supplied into the collision cell 232 according to the measurement conditions.

The mass spectrometer unit 2 can perform various measurements, such as a selected ion monitoring (SIM) measurement, MS/MS scan measurement (product ion scan measurement), or multiple reaction monitoring (MRM) measurement. In the case of the SIM measurement, no selection of an ion is performed in the front quadrupole mass filter (Q1) 231 (i.e. this mass filter is disabled from functioning), while the mass-to-charge ratio at which ions are allowed to pass through the rear quadrupole mass filter (Q3) 233 and be detected is fixed.

On the other hand, in the MS/MS scan measurement or MRM measurement, the front quadrupole mass filter (Q1) 231 and rear quadrupole mass filter (Q3) 234 are both made to function as mass filters. The front quadrupole mass filter (Q1) 231 allows only an ion having a mass-to-charge ratio designated as the precursor ion to pass through. Additionally, CID gas is supplied into the collision cell 232 to fragment the precursor ion into product ions. In the MS/MS scan measurement, the mass-to-charge ratio at which ions are allowed to pass through the rear quadrupole mass filter (Q3) 234 is continuously changed during the process of detecting the product ions. In the MRM measurement, the mass-to-charge ratio at which ions are allowed to pass through the rear quadrupole mass filter (Q3) 234 is fixed during the process of the detecting product ions. It should be noted that the present embodiment is concerned with the case of quantitatively determining each target compound using mass chromatogram data obtained for a plurality of target compounds through an MRM measurement. Accordingly, the following descriptions only deal with the matters relating to the MRM measurement.

The controlling-processing unit 4 has a storage section 41 and the following functional blocks: measurement controller 42, measurement data input receiver 43, screen-display numerical data creator 44, selection operation receiver 45, screen-display graphical data creator 46, graphical data creation progress displayer 47, and display processor 48. The controlling-processing unit 4 is actually a personal computer having a central processing unit (CPU), with the CPU acting as the previously mentioned functional components by executing a program for liquid chromatographic mass spectrometry preinstalled on the computer. An input unit 6 and display unit 7 are connected to the controlling-processing unit 4. A compound database 411, method file storage section 412, and measurement data file storage section 413 are provided in the storage section 41.

Figure 2:
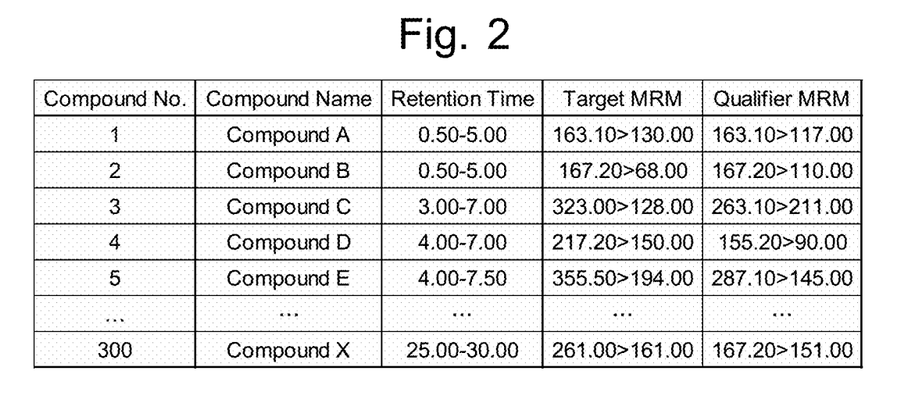
FIG. 2 is one example of the MRM measurement conditions.

The compound database 411 contains molecular structure information, MRM measurement conditions, calibration-curve information and other items of information for various compounds. As shown in FIG. 2, the MRM measurement conditions include the compound name, retention time, target MRM transition, and qualifier MRM transition related to each other. The method file storage section 412 holds method files prepared for standard MRM measurements (standard method files). For example, each standard method file is prepared according to the kind of measurement (e.g. the quantitative measurement of an agricultural chemical contained in a food product), characteristics of the sample and other factors. Each standard method file is given a classification name and contains information concerning the compounds designated as the targets of the measurement.

Figure 3:
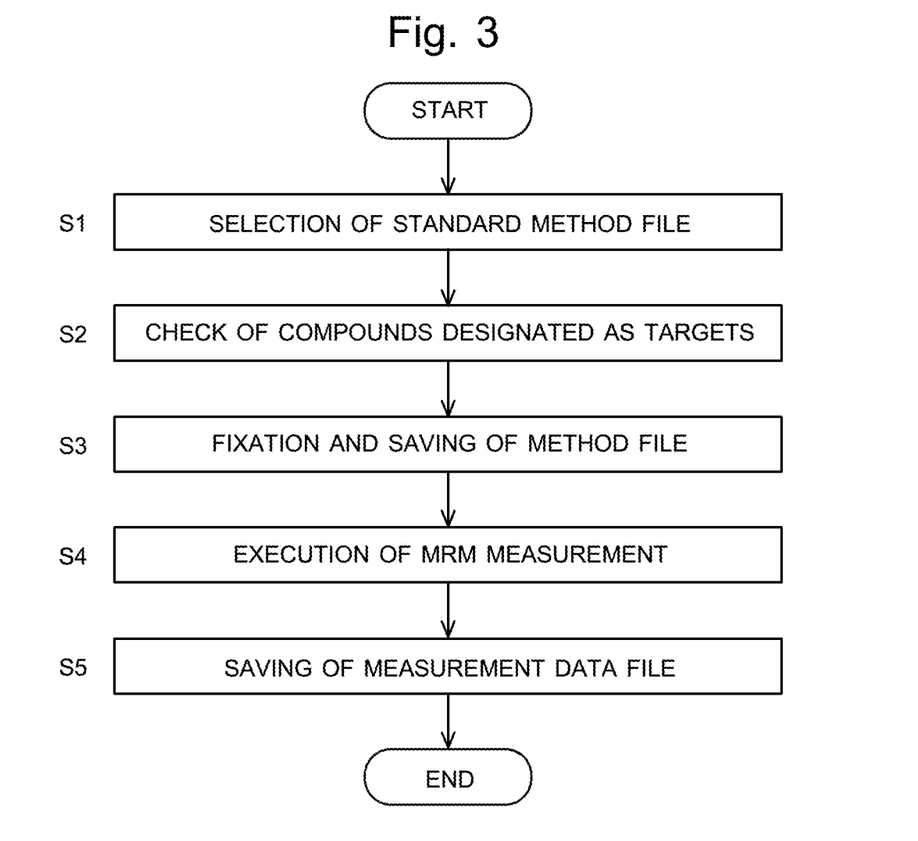
FIG. 3 is a flowchart illustrating the steps of a measurement of a sample in the liquid chromatograph mass spectrometer system in the present embodiment.

A measurement using the liquid chromatograph mass spectrometer system in the present embodiment is hereinafter described with reference to the flowchart in FIG. 3.

A user who is going to perform a measurement on the target compounds contained in a sample selects one of the standard method files stored in the method file storage section 412 (Step S1). Upon selection of a standard method file by the user, the measurement controller 42 reads, from the compound database 411, the MRM measurement conditions corresponding to the compounds included in the selected standard method file, and displays the read information on the display unit 7. The user visually checks the list of the displayed compounds and determines whether they are the same as the compounds designated as the targets (Step S2). Any compound that is not designated as a target should be removed from the displayed compound list. If there is a target compound that is not included in the list, the information concerning that compound should be read from the compound database 411 and added to the method file. In this manner, the user prepares the method file to be used for the measurement. The completed method file is stored in the method file storage section 412 (Step S3).

The user sets a sample in the autosampler 14 and issues a command to initiate the measurement. Then, the controlling-processing unit 4 reads the method file from the method file storage section 412 and conducts an MRM measurement according to the measurement conditions described in the method file (Step S4). That is to say, the autosampler 14 introduces the sample into the injector 12. During each period of time (retention time) within which one of the target compounds contained in the sample flows from the column 13 into the mass spectrometer unit 2, the mass spectrometer unit 2 detects product ions using the target MRM transition and the qualifier MRM transition, and measures the intensities of those product ions. The data obtained by the measurement are sequentially stored in the storage section 41.

After the completion of all MRM measurements described in the method file, the sets of measurement data respectively obtained for the target compounds are compiled into one measurement data file. This file is related to the method file used for the measurements and stored in the measurement data file storage section 413 (Step S5).

Figure 4:
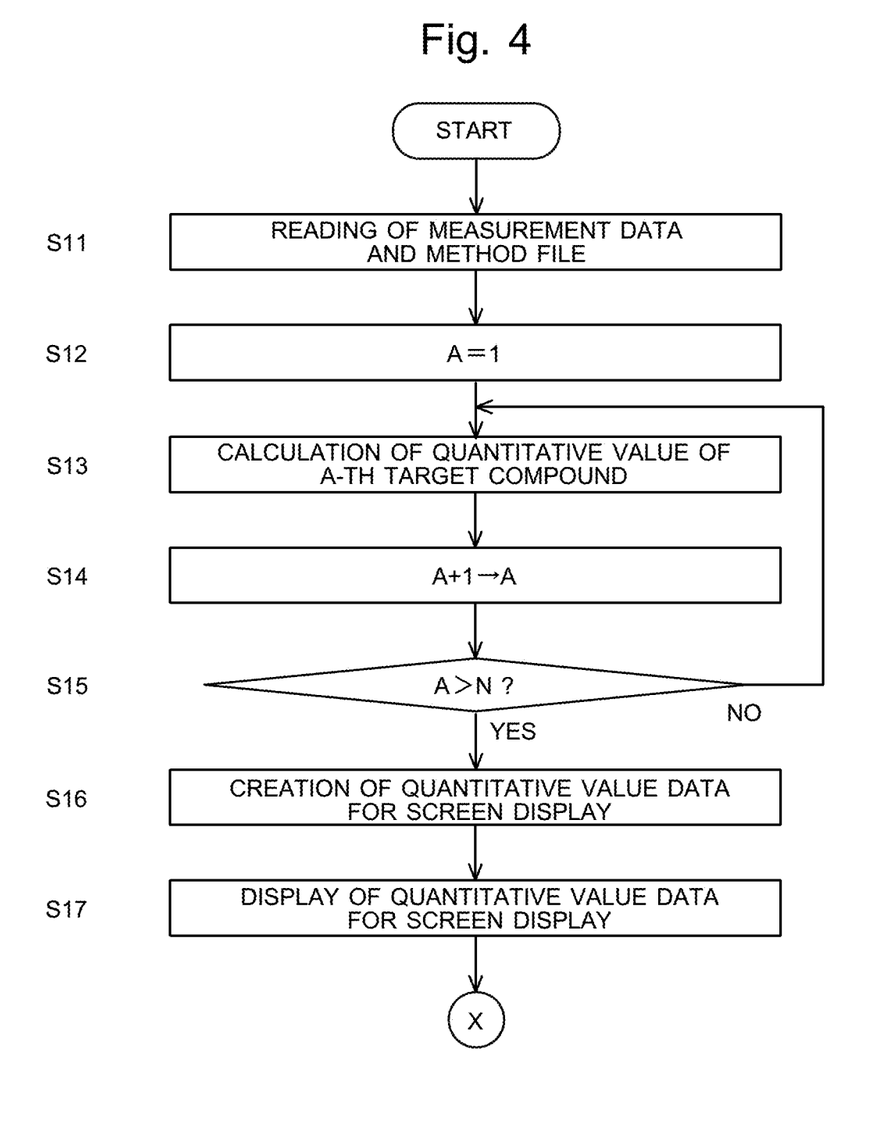
FIG. 4 is the first half of a flowchart illustrating the steps of the processing of measurement data obtained for a sample in the liquid chromatograph mass spectrometer system in the present embodiment.
Figure 5:
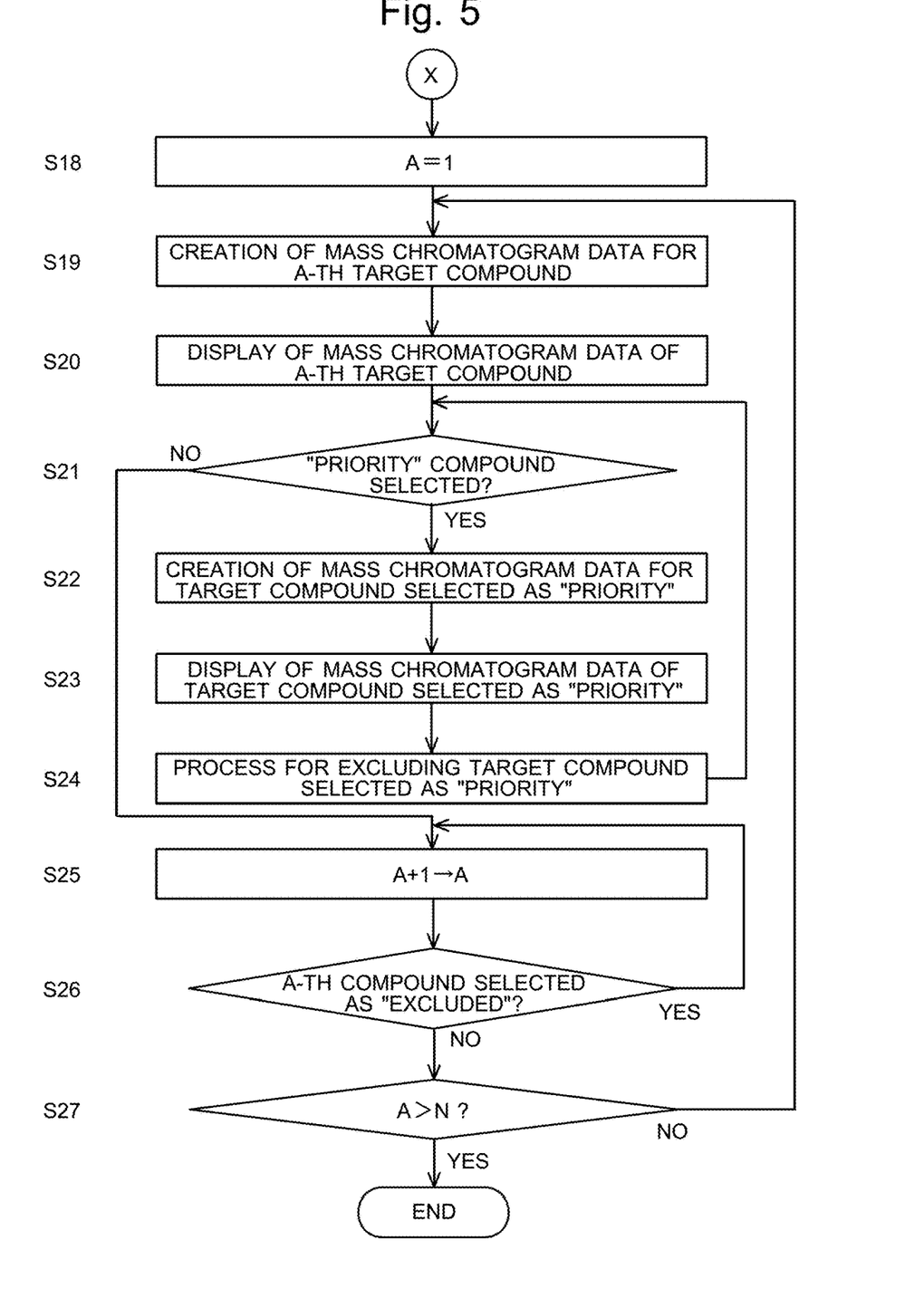
FIG. 5 is the second half of a flowchart illustrating the steps of the processing of measurement data obtained for a sample in the liquid chromatograph mass spectrometer system in the present embodiment.

Next, the operation of processing measurement data is described with reference to the flowchart of FIGS. 4 and 5. The following steps correspond to the measurement data processing method according to the present invention.

A user performs a specific operation through the input unit 6 to issue a command to initiate the processing of the measurement data. Then, the measurement data input receiver 43 displays a list of measurement data files and prompts the user to select a file. When one of the measurement data files has been selected by the user, the measurement data input receiver 43 reads the mass chromatogram data (which correspond to the measurement data in the present invention) of the plurality of target compounds described in the read measurement data file, along with the method file which was used when the mass chromatogram data were obtained (Step S11), and displays the content of that method file on the display unit 7. In Step S11, the measurement data input receiver 43 may prompt the user to select a method file, in which case the measurement data input receiver 43 opens a measurement data file which was obtained by using that method file.

Next, the screen-display numerical data creator 44 sets the variable A to 1 (Step S12) and checks the number (N) of target compounds described in the method file. Then, the screen-display numerical data creator 44 reads the mass chromatogram data corresponding to the target MRM transition from the measurement data of the A-th target compound (initially, A=1) described in the method file, and subtracts the base line from the mass chromatogram data. Other necessary processes may also be performed, such as the correction of the inclination of the baseline. Conventionally known appropriate techniques can be used for those processes. After those processes have been performed, the screen-display numerical data creator 44 determines the peak portion in the mass chromatogram, calculates its area value, and compares the area value with the calibration-curve information to calculate the quantitative value (Step S13). Alternatively, the screen-display numerical data creator 44 may be configured to calculate the quantitative value by a method that does not use a calibration curve. For example, it may use a mathematical formula which expresses the relationship between the area value and the quantitative value, or refer to a table in which area values are related to quantitative values.

After the quantitative value for one target compound has been calculated, the screen-display numerical data creator 44 adds 1 to A (Step S14) and determines whether or not the new value of A is greater than N (Step S15). If A is equal to or less than N (NO in Step S15), one or more target compounds whose quantitative values have not been calculated remain. Accordingly, the screen-display numerical data creator 44 returns to Step S13 and performs the previously described processes to determine the quantitative value of the A-th target compound. After that, Steps S14 and S15 are once more performed.

If A is greater than N (YES Step S15), the screen-display numerical data creator 44 determines that the calculation of the quantitative value has been completed for all target compounds, and creates quantitative value data for screen display for showing the calculated quantitative values of the target compounds on the display unit 7 (Step S16). These data correspond to the numerical data for screen display in the present invention.

Figure 6A:
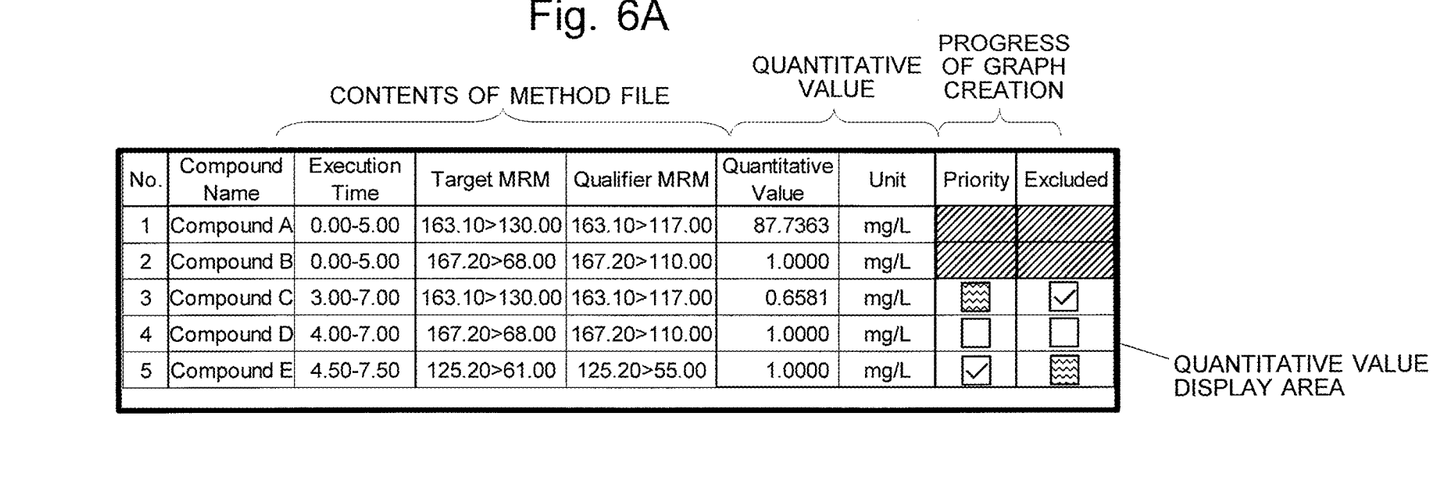
FIGS. 6A and 6B are a display example of the numerical data for screen display in the liquid chromatograph mass spectrometer system in the present embodiment.

The quantitative value data for screen display created in Step S16 are displayed in a form that depends on a user operation (Step S17). Specifically, the display processor 48 compares the size of a quantitative value display area specified the user (or the size of a quantitative value display area initially set by the software, if the size-setting operation by the user has not been performed) with the size of a display area that will be necessary for displaying the quantitative values of all target compounds with a predetermined size. If the former area is larger than the latter (i.e. if the quantitative values of all target compounds can be displayed), the display processor 48 simultaneously displays all quantitative values next to the contents of the method file, as shown in FIG. 6A.

Figure 6B:
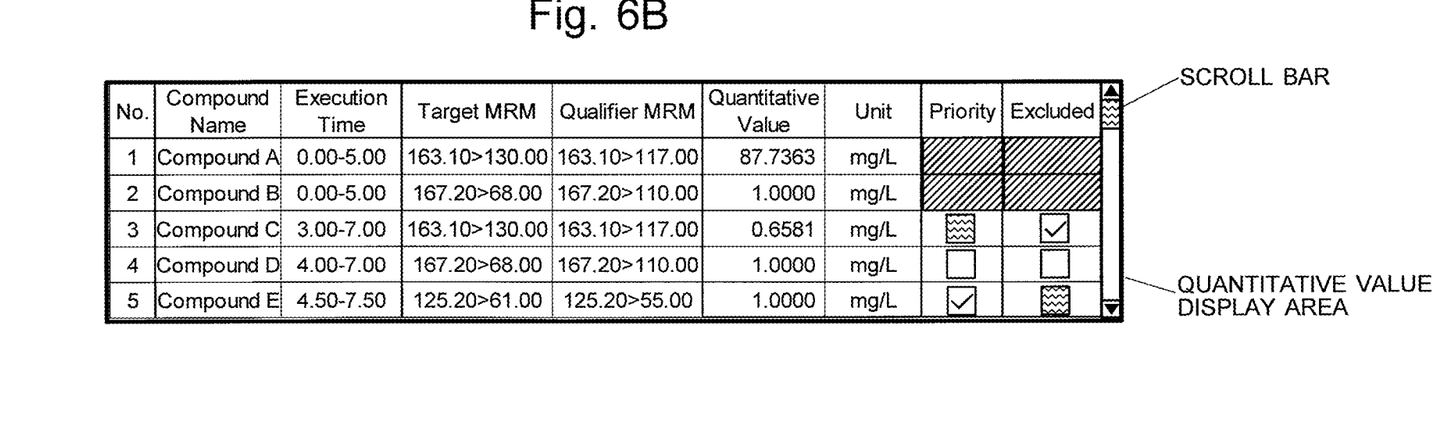

If the latter area is larger than the former (i.e. when the number of target compounds is too large to simultaneously display the quantitative values of all target compounds within the quantitative value display area specified by the user), the display processor 48 displays the quantitative values of a certain number of target compounds that can be simultaneously displayed next to the contents of the method file on the display unit 7, with a scroll bar added to the quantitative value display area, as shown in FIG. 6B. According to an operation of the scroll bar by the user, the display processor 48 displays the quantitative values of the target compounds other than the already displayed ones.

After the quantitative value data for screen display showing the quantitative values have been created for all target compounds by the screen-display numerical data creator 44, and the display of the quantitative value data for screen display according to the user operation on the screen by the display processor 48 has been completed, the selection operation receiver 45 adds columns next to the displayed data to allow the user to input the necessity/non-necessity of the creation of the graphical data for screen display as well as the priority. It should be noted that the selection operation receiver 45 in the present embodiment is a component that corresponds to the preferential selection operation receiver according to the present invention.

Subsequently, the screen-display graphical data creator 46 resets the variable A to 1 (Step S18) and creates mass chromatogram data for screen display (graphical data for screen display) based on the mass chromatogram data of the A-th target compound (initially, A=1) described in the method file (Step S19). In the present embodiment, since two MRM transitions, i.e. the target MRM transition and the qualifier MRM transition, are used in the measurement, two sets of mass chromatogram data are obtained for each target compound. Accordingly, two sets of mass chromatogram data for screen display which respectively correspond to the two MRM transitions are created for each target compound.

Figure 7:
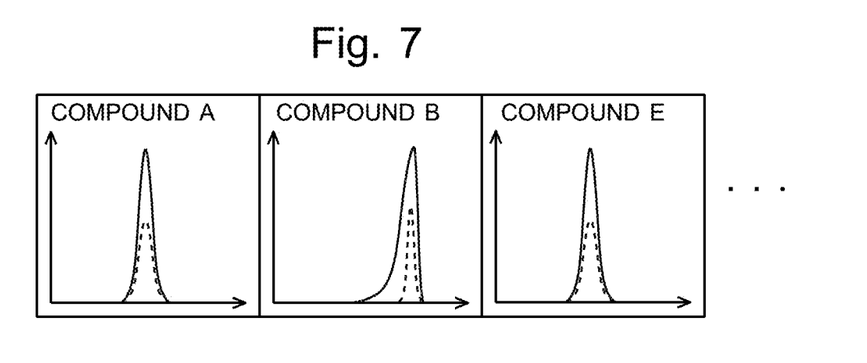
FIG. 7 is a display example of the graphical data for screen display in the liquid chromatograph mass spectrometer system in the present embodiment.

When the mass chromatogram data is created for the first time, there is a sufficient space in the mass chromatogram display area on the display unit 7, since no data is displayed. Therefore, the created mass chromatogram data for screen display is directly displayed on the display unit 7 by the display processor 48 (Step S20). FIG. 7 is one example of the displayed mass chromatogram data for screen display (which shows the mass chromatogram data for screen display for compounds A, B and E created and displayed through the steps which will be described later). The mass chromatogram corresponding to the target MRM transition is drawn in the solid line, on which the mass chromatogram corresponding to the qualifier MRM transition is drawn in the dashed line. For example, the user can compare the peak shapes of the two mass chromatograms to determine the appropriateness of the quantitative value of the target compound based on the similarity in peak shape, intensity ratio and other aspects of the two mass chromatograms which respectively correspond to the target MRM transition and the qualifier MRM transition.

Specifically, as for the compounds A and E, since the mass chromatogram created from the target MRM transition has the same (similar) peak shape as the mass chromatogram created from the qualifier MRM transition, it is possible to determine that the mass chromatogram of the target MRM transition is not affected by foreign substances, and the quantitative value is appropriate. As for the compound B, the mass chromatogram of the target MRM transition has an asymmetrical peak and its shape is different from that of the mass chromatogram of the qualifier MRM transition. This means that the mass chromatogram created from the target MRM transition is likely to have been affected by foreign substances. Therefore, it is possible to determine that appropriate processing (such as the separation of the mass chromatogram peak) must be performed before the calculation of the quantitative value.

The graphical data creation progress displayer 47 changes the background color of the "priority" and "excluded" fields corresponding to a target compound for which the mass chromatogram data for screen display have been created, as well as deletes the checkboxes in those fields. In the example of FIGS. 6A and 6B, the mass chromatogram data for screen display for compounds A and B have been created, and the background color of the "priority" and "excluded" fields corresponding to those compounds is changed. Thus, the user can recognize the compounds for which the process of creating mass chromatogram data for screen display have been completed, i.e. the progress of the creation of the mass chromatogram data for screen display. The form of the display of the progress is not limited to this example; there are various display forms that can be adopted for the graphical data creation progress displayer 47. For example, it may indicate the progress by displaying, within a separate display area, the identification numbers of the target compounds for which the mass chromatogram data for screen display have already been created. The background color is not changed for compounds which the user has designated as "excluded" compounds by checking their respective boxes.

While the process of creating and displaying mass chromatogram data for screen display is ongoing, the user can check the quantitative value of each target compound which has already been displayed, and determine whether or not detailed analytical work for that compound is necessary. For example, the user can determine that the checking of the mass chromatogram is unnecessary for a target compound whose quantitative value is less than a predetermined value. The user can exclude such a target compound from the targets of the creation of the mass chromatogram data for screen display by checking the "excluded" box displayed with the quantitative value. In the present embodiment, the "excluded" box corresponding to compound C having a quantitative value of less than 1.0 mg/L is checked so that this compound will be excluded from the targets of the creation of the mass chromatogram data for screen display.

If there is a target compound which the user is interested in and desires to check as early as possible, the user clicks the "priority" checkbox corresponding to that target compound to instruct the device to give priority to that target compound in the creation of the mass chromatogram data for screen display. Upon detecting the selection of either the "priority" or "excluded" checkbox by the user, the selection operation receiver 45 disables the other checkbox and changes its background color.

After the mass chromatogram data for screen display for the first target compound has been displayed on the display unit 7, the screen-display graphical data creator 46 determines whether or not there is any "priority" box which has been checked by the user during the process (Step S21). If there is a "priority" box which has been checked by the user (YES Step S21), the screen-display graphical data creator 46 creates the mass chromatogram data for screen display for that compound (Step S22) and displays the data (Step S23). In the present embodiment, since the "priority" box for compound E is checked, the mass chromatogram data for screen display for this compound should be created earlier than the data for compound D. Therefore, as shown in FIG. 7, the mass chromatogram data for screen display for compound E is created and displayed after the compounds A and B.

After the mass chromatogram data for screen display for one target compound has been created and displayed, the screen-display graphical data creator 46 performs an excluding process (which is similar to the process that is performed when the "excluded" box has been checked by the user) in order to prevent the data creation process from being once more performed for the same compound. As for the "priority" and "excluded" fields, the background color is changed, and the checkbox is deleted, as with the target compounds for which the mass chromatogram data for screen display have been created and displayed (Step S24). If the "priority" boxes for two or more target compounds have been checked by the user in Step S21, the creation (Step S22) and display (Step S23) of the mass chromatogram data for screen display is performed for each of those compounds, and the excluding process for those compounds subsequently is performed in Step S24.

Whether or not a created mass chromatogram for screen display will be immediately displayed on the display unit 7 also depends on the size of the display area set by the user, as in the previously described case of the screen display of the quantitative values. If there are a large number of target compounds for which mass chromatograms have been created, the mass chromatogram data for screen display are created so that the mass chromatograms can be quickly displayed in response to a screen-scrolling operation by the user.

Subsequently, the screen-display graphical data creator 46 returns to Step S21 and repeats the previously described processes. In Step S21, if there is no "priority" box which has been checked by the user (NO in Step S21), the screen-display graphical data creator 46 adds 1 to A (Step S25) and determines whether or not the "excluded" box for the target compound corresponding to the new value of A has been checked by the user. If the "excluded" box has been checked by the user (YES in Step S26), the screen-display graphical data creator 46 returns to Step S25. If the "excluded" box has not been checked by the user (NO in Step S26), the screen-display graphical data creator 46 determines whether or not A is greater than N (Step S27).

If A is equal to or less than N (NO in Step S27), one or more target compounds for which mass chromatogram data for screen display have not created remain. Therefore, the screen-display graphical data creator 46 returns to Step S19 and repeats the previously described processes to create (and display) the mass chromatogram data for screen display for the A-th target compound.

If A is greater than N (YES in Step S27), the screen-display graphical data creator 46 determines that the creation (and display) of the mass chromatogram data for screen display has been completed for all target compounds, and discontinues the entire sequence of the processes.

In the data processing method and device as well as the program according to the present embodiment, the quantitative values of the target compounds are displayed on the screen in advance of the screen display of the mass chromatograms of those compounds. Therefore, the user can perform preparatory analyses, such as the determination on which of the target compounds requires detailed analytical work. For example, if there is a target compound whose quantitative value is nearly zero, it is possible to consider that the compound was not contained in the sample. The user can determine that no detailed analysis is necessary for such a compound. If a quantitative value calculated (and displayed) by the screen-display numerical data creator 44 has been identified as an outlier which is significantly distant from a previously expected range, it is most likely that there was a problem with the shape of the peak extracted by the screen-display numerical data creator 44 in the process of calculating the quantitative value. Accordingly, the user can determine that the peak shape of the mass chromatogram of that target compound needs to be checked.

The present invention is characterized in that the process for the creation and display of the numerical data for screen display (in the present embodiment, the quantitative value data for screen display) is performed in advance of the time-consuming process for the creation and display of the graphical data for screen display (in the embodiment, the mass chromatogram data for screen display). Such a processing sequence allows users to check the quantitative value of each target compound and consider how to proceed with the subsequent analytical work, without waiting for the creation and display of the graphical data for screen display. The creation and display of the graphical data for screen display can also be performed more efficiently than ever before, since those processes are performed for each target compound, thereby allowing users to sequentially check the graphs (in the embodiment, mass chromatograms, etc.) in order of completion. It should be noted that the processes and components which are essential to the present invention are only those which are necessary for implementing such a technical idea. Some of the processes and components described in the previous embodiment (e.g. the use of the "excluded" and "priority" checkboxes, or the display of the method file on the screen) are preferable but not essential.

Figure 8:
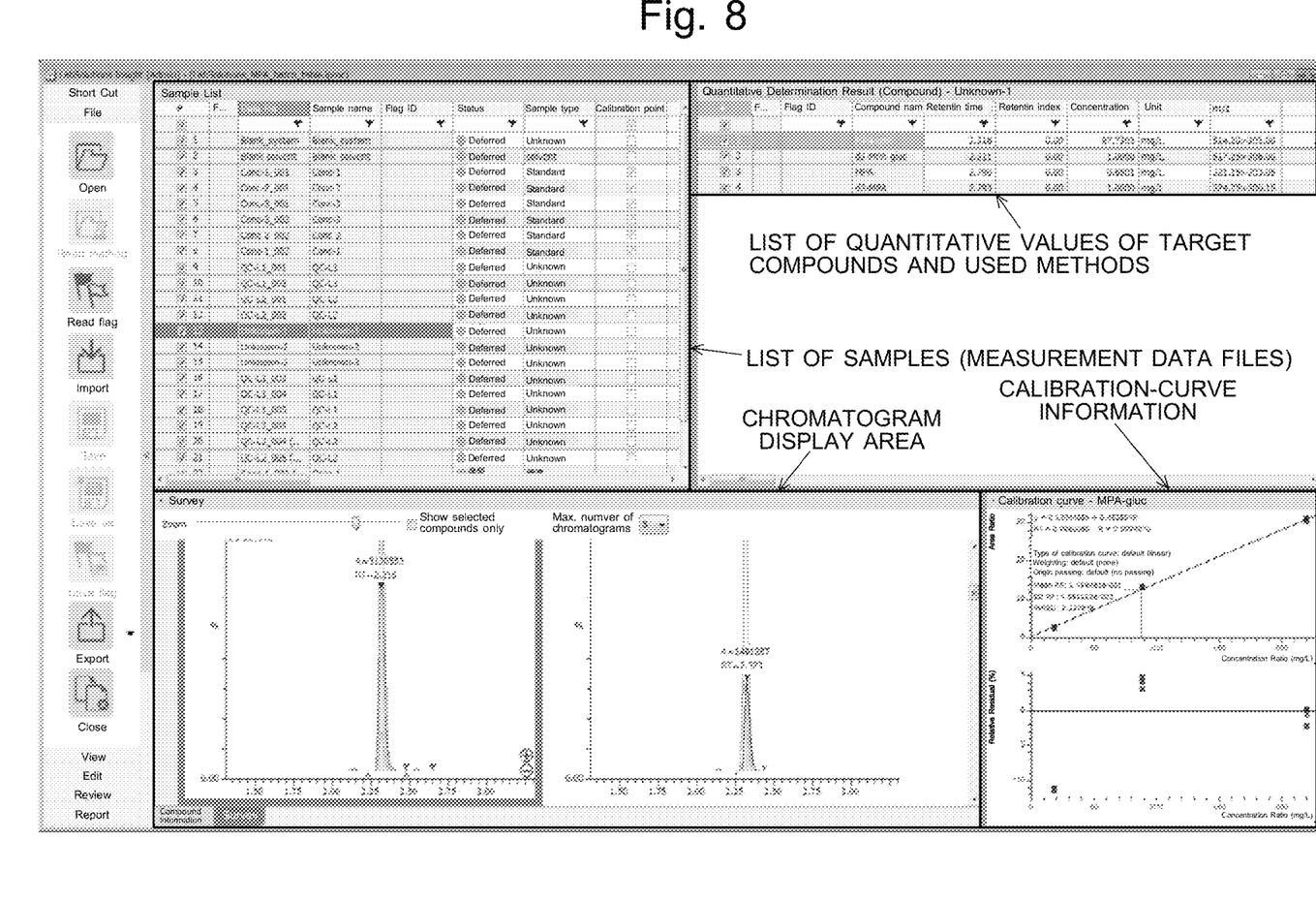
FIG. 8 is another example of the screen display in the liquid chromatograph mass spectrometer system in the present embodiment.

The previous embodiment is a mere example and may be appropriately changed or modified within the spirit of the present invention. Although the description in the previous embodiment was concerned with the case of processing mass chromatogram data obtained by an MRM measurement for a plurality of target compounds contained in one sample (i.e. the case of processing only one measurement data file), the present invention can also be used for processing mass chromatogram data obtained by an MRM measurement for a plurality of target compounds contained in each of a plurality of samples (i.e. for collectively processing two or more measurement data files). FIG. 8 shows one example of the screen display in the case where such a process has been performed.

In the example shown in FIG. 8, a sample list (i.e. a list of measurement data files) is displayed in the upper left section of the screen of the display unit 7. This list is displayed in a scrollable form to allow for the handling of a large number of measurement data files. Another list, which is displayed in the upper right section of the screen, shows the quantitative values and method files for the target compounds subjected to a measurement for one sample selected in the sample list. In the present example, since the selected sample has only a small number of target compounds, all target compounds are displayed.

The lower left section of the screen is a mass chromatogram display area. Mass chromatograms of two target compounds are displayed. Four target compounds are selected in the upper right list, whereas the mass chromatogram display area allows only a maximum of two mass chromatograms to be simultaneously displayed. The other mass chromatograms can be displayed by the scrolling operation. Additionally, calibration-curve information used for the target compound corresponding to a mass chromatogram selected by the user is graphically displayed in the lower right section of the screen. The location of each measured value on the calibration curve is indicated on the graph.

Although any of the previous embodiments is concerned with the case of creating and displaying quantitative value data for screen display and mass chromatogram data for screen display based on mass chromatogram data obtained with a liquid chromatograph mass spectrometer system, the measurement data processing method and device as well as the program according to the present invention can also be used to process measurement data obtained with other types of analyzers. For example, in the case where the measurement data are spectrum data, the screen-display numerical data creator is configured to extract a peak portion from the data, calculate an area value or height of the peak portion, compare the calculated value with prepared calibration-curve information, as well as create and display numerical data for screen display based on the comparison result. The screen-display graphical data creator is configured to create, for example, two-dimensional spectrum data for screen display with the vertical axis indicating absorbance and the horizontal axis indicating wavelength. In the case where the measurement data are mass spectrum data, the screen-display numerical data creator is configured to calculate a quantitative value from the intensity of each mass peak as well as create and display numerical-value data for screen display from the quantitative values, while the screen-display graphical data creator is configured to create and display mass spectrum data for screen display with the vertical axis indicating intensity and the horizontal axis indicating mass-to-charge ratio.

REFERENCE SIGNS LIST

1 . . . Liquid Chromatogram Unit
2 . . . Mass Spectrometer Unit
4 . . . Controlling-Processing Unit
   41 . . . Storage Section
      411 . . . Compound Database
      412 . . . Method File Storage Section
      413 . . . Measurement Data File Storage Section
   42 . . . Measurement Controller
   43 . . . Measurement Data Input Receiver
   44 . . . Screen-Display Numerical Data Creator
   45 . . . Selection Operation Receiver
   46 . . . Screen-Display Graphical Data Creator
   47 . . . Graphical Data Creation Progress Displayer
   48 . . . Display Processor
6 . . . Input Unit
7 . . . Display Unit

The invention claimed is:

1. A measurement data processing method to be used for graphically displaying measurement data for each of a plurality of target compounds and for performing quantitative determination for each of the plurality of target compounds, the measurement data processing method comprising steps of:
performing a previously determined process on measurement data for each of the plurality of target compounds, to calculate a quantitative value and create numerical data for screen display;
subsequently performing a previously determined process on measurement data for each of the plurality of target compounds to create graphical data for screen display, while displaying the numerical data representing the quantitative value for each of the plurality of target compounds on a screen of a display; and
subsequently displaying the graphical data representing the measurement data for each of the plurality of target compounds.

2. A measurement data processing device to be used for graphically displaying measurement data for each of a plurality of target compounds and for performing quantitative determination for each of the plurality of target compounds, the measurement data processing device comprising:
a display; and
a processor configured to:
receive an input of measurement data of the plurality of target compounds;
perform a previously determined process on measurement data for each of the plurality of target compounds, to calculate a quantitative value and create numerical data for screen display;
subsequently perform a previously determined process on measurement data for each of the plurality of target compounds to create graphical data for screen display, while displaying the numerical data representing the quantitative value for each of the plurality of target compounds on a screen of the display; and
subsequently display, on the screen of the display, a portion or entirety of the numerical data for screen display and the graphical data for screen display in a form that depends on a user operation.

3. The measurement data processing device according to claim 2, wherein
the processor further configured to display a progress of creation of the graphical data for screen display for the plurality of target compounds in such a manner that a target compound for which the graphical data for screen display is already created is distinguishable from a target compound for which the graphical data for screen display is not created.

4. The measurement data processing device according to claim 3, wherein
the processor further configured to receive an operation by a user for selecting one or more target compounds which need to be preferentially processed among the target compounds for which the graphical data for screen display is not created, and
to preferentially create the graphical data for screen display for the one or more selected target compounds.

5. A non-transitory computer readable medium recording a program for processing measurement data to be used for graphically displaying measurement data for each of a plurality of target compounds and for performing quantitative determination for each of the plurality of target compounds, wherein:
the program for processing measurement data is configured to make a computer having a display performs functions of:

receiving an input of measurement data of the plurality of target compounds;

performing a previously determined process on measurement data for each of the plurality of target compounds, to calculate a quantitative value and create numerical data for screen display;

subsequently performing a previously determined process on measurement data for each of the plurality of target compounds to create graphical data for screen display, while displaying the numerical data representing the quantitative value for each of the plurality of the target compounds on a screen of the display; and displaying, on the screen of the display, a portion or entirety of the numerical data for screen display and the graphical data for screen display in a form that depends on a user operation.

* * * * *